United States Patent [19]

Vezain

[11] Patent Number: 5,214,970
[45] Date of Patent: Jun. 1, 1993

[54] HIGHLY ACCURATE ROTATIONAL COUPLING DEVICE AND TRANSLATION CONTROL DEVICE COMPRISING SAME, IN PARTICULAR FOR OPTICAL INSTRUMENTS

[75] Inventor: Gérard Vezain, Mandelieu, France

[73] Assignee: Aerospatiale Societe Nationale Industrielle, Paris, France

[21] Appl. No.: 706,782

[22] Filed: May 29, 1991

[30] Foreign Application Priority Data

Jun. 22, 1990 [FR] France .................. 90 07851

[51] Int. Cl.⁵ ............................. F16D 3/52
[52] U.S. Cl. ................. 74/18.1; 74/89.15; 464/80; 359/824
[58] Field of Search ........... 464/79, 80; 403/291, 403/229, 286, 287; 359/823, 824; 74/89.15, 18.1, 501.5 R

[56] References Cited

U.S. PATENT DOCUMENTS

| | | |
|---|---|---|
| 2,274,154 | 2/1942 | Morgan et al. |
| 2,603,125 | 7/1952 | Evers ........................ 359/823 X |
| 2,607,233 | 8/1952 | Bosch ........................ 74/18.1 |
| 2,909,079 | 10/1959 | Fawkes ....................... 74/509 |
| 3,754,411 | 8/1973 | Orain ......................... 464/79 |
| 4,084,409 | 4/1978 | Wolf et al. ................... 464/79 |
| 4,232,756 | 11/1980 | Bathelt ...................... 464/79 X |
| 4,250,762 | 2/1981 | Weatherby ................... 74/89.15 |
| 4,645,473 | 2/1987 | Mochizuki ................... 464/79 |
| 5,042,914 | 8/1991 | Hulderman et al. ........... 359/824 |

FOREIGN PATENT DOCUMENTS

| | | |
|---|---|---|
| 1283030 | 11/1968 | Fed. Rep. of Germany . |
| 3623112 | 1/1987 | Fed. Rep. of Germany ..... 74/89.15 |
| 3639092 | 5/1988 | Fed. Rep. of Germany . |
| 258788 | 12/1969 | U.S.S.R. ...................... 464/80 |
| 943437 | 12/1963 | United Kingdom . |

Primary Examiner—Richard M. Lorence
Assistant Examiner—Khoi Q. Ta
Attorney, Agent, or Firm—Remy J. VanOphem

[57] ABSTRACT

A rotational coupling device having two flanges with normally coincident axes and centers on the axes, a constant length flexible wire joining the centers, a spring compressed between the flanges and coaxial with the wire and a bellows that is rigid in torsion fixed to the flanges.

6 Claims, 1 Drawing Sheet

HIGHLY ACCURATE ROTATIONAL COUPLING DEVICE AND TRANSLATION CONTROL DEVICE COMPRISING SAME, IN PARTICULAR FOR OPTICAL INSTRUMENTS

BACKGROUND OF THE INVENTION

The invention concerns a translation control device usable among other things for focusing an optical instrument on a spacecraft, for example, and more generally any highly accurate rotational coupling device.

Optical instruments on board satellites, such as telescopes, for example, in some cases include focusing mechanisms in order to improve the quality of the images received. The function of such mechanisms is to optimally position one or more lenses disposed in the optical field in order to focus the light beam correctly.

The lens is to this end moved in rectilinear displacement along the optical axis of the light beam by a motorized device in practice consisting of an electrical rotating stepper motor, the output shaft of which cooperates with a lead screw type translation control system.

The lens also cooperates with a pure translation guidance system along the optical axis. The system must be highly accurate as it must avoid any misalignment of the lens relative to the optical axis, as a result of rotation and/or transverse displacement.

The motorized device controlling the axial displacement of the lens must, on the one hand, guarantee the integrity of the guidance function so as to avoid compromising the optical performance of the mechanism since it must not result in any angular or transverse offset of the optical axis. On the other hand, the motorized device must provide an adequate motor drive margin without requiring excessive onboard power, as it must not generate disturbing resisting forces or torques.

The displacement control device must, therefore, enable application to the lensholder assembly of a force F parallel to the optical axis without generating any disturbing mechanical stresses, such as forces transverse to the optical axis, tilting moments, etc.

Disturbing mechanical stresses appear immediately when there is any misalignment, even less than one degree, between the motor axis and the axis of the lead screw device. Misalignment is difficult to prevent because of manufacturing tolerances, assembly defects, temperature variations that can cause differential thermal expansion, and so on.

SUMMARY OF THE INVENTION

An object of the invention is to provide a rotational coupling device, sometimes referred to as a "transmission seal", which is adapted to couple an electrical rotary stepper motor and a lead screw device in a focusing mechanism of the aforementioned type which is able to minimize disturbing mechanical stresses and guarantee highly accurate kinematic properties, even in the presence of an angular and/or transverse offset between the axes of the members to be coupled.

Until now, consideration has been given to using universal joints or OLDHAM joints. However, joints such as these have major defects including complex architecture; large overall dimensions; friction loads which require, especially in space applications, tribological design features and appropriate technologies (absolute control of the coefficients of friction during service life (in practice several years), absolute control of resisting torques, etc); and transmission play causing impact and lack of accurate transmission.

The invention is directed to alleviating the aforementioned drawbacks by eliminating play and friction and thereby limiting the disturbing mechanical stresses to very low levels.

Another object of the invention is to alleviate the harmful consequences of misalignment or offset while procuring a constant longitudinal distance between the members to be coupled. This is particularly important in the case of a translation control system of the aforementioned type in which any uncontrolled variation of the distance between the members results in a longitudinal positioning error. This can be particularly serious in the case of a focusing mechanism where the required accuracy of positioning can be as low as one hundredth of a millimeter or even a few microns.

It will be understood that achieving stiffness in torsion and in tension/compression would seem a priori to be incompatible with achieving flexibility.

A final object of the invention is to achieve the aforementioned advantages in a reliable and durable way, for example, throughout the service life of a spacecraft optical instrument, which is typically seven years when focusing is required every day.

To this end the invention proposes a rotational coupling device constituted by two flanges with normally coincident axes and centers on the axes, a constant length flexible wire joining the centers, a spring compressed between the flanges and coaxial with the wire and a bellows that is rigid in torsion attached to the flanges.

According to preferred features of the invention, which may be combined, the spring is inside the bellows; the wire is a metal wire; the coefficient of thermal expansion of the metal wire is less than $10^{-6}$ deg$^{-1}$; and the bellows is a metal bellows.

The invention further proposes a device for controlling translation in a displacement direction which includes a motor driving an axially fixed rotatable shaft, a nut attached to a mobile system having an axis parallel to the displacement direction and a lead screw inserted in the nut, with the rotating shaft and the screw being substantially coaxial and attached to flanges of a rotational coupling device of the aforementioned type.

Objects, characteristics and advantages of the invention will emerge from the following description given by way of non-limiting example with reference to the drawings appended hereto.

DETAILED DESCRIPTION OF THE PREFERRED EMBODIMENT

Figure 1:
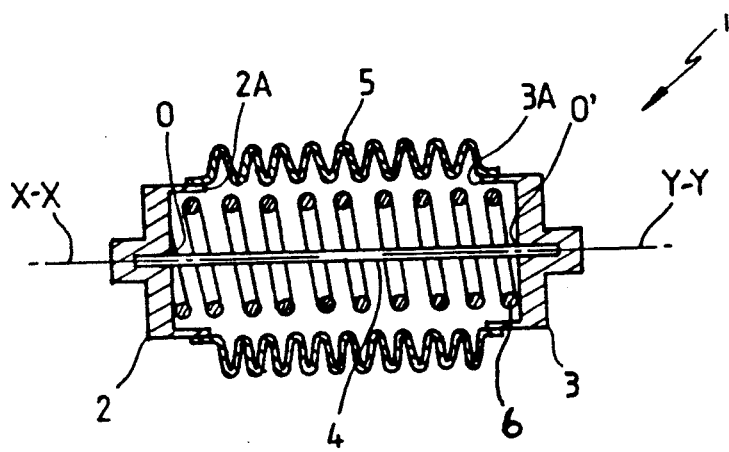
FIG. 1 is a view in longitudinal cross-section of a rotational coupling device in accordance with the invention.

FIG. 1 depicts a coupling device 1 having two end flanges 2 and 3 with respective axes X—X and Y—Y adapted to be coupled to two members that are to be coupled in rotation. The aforementioned axes are, therefore, axes of rotation.

The flanges are joined by a flexible wire 4 of constant length with a low or even zero coefficient of thermal expansion, made from metal, for example, and fixed at its ends to points 0 and 0' on the axis of the respective flange. Note that in FIG. 1 the wire 4 has its ends embedded in the flanges 2 and 3 on the axes X—X and Y—Y. The flanges are in practice discs of which the points 0 and 0' are the centers and the axes X—X and Y—Y are normally coincident thereto.

The flanges are also coupled by a bellows 5, for example, a metal bellows, which is flexible in bending but stiff in torsion. The bellows is coaxial with the wire 4. The bellows is welded to the flanges as shown, for example in this instance, to a peripheral annular flange 2A or 3A thereof.

Finally, a spring 6 which is coaxial with the wire is compressed between the flanges 2 and 3. In the example illustrated, the spring is inside the bellows.

It will be understood that the wire 4 in combination with the spring 6 which tensions the wire maintains a constant distance between the points 0 and 0', while allowing some flexibility.

The bellows 5 transmits torque by torsion without compromising this flexibility.

The coupling device 1, therefore, meets the objective of the invention as it provides both stiffness in torsion and in dension/compression and significant flexibility in bending.

Another advantage of a structure of this kind is that it enables the natural frequency of the coupling device 1 to be chosen independently of its other mechanical properties. By altering the cross-section of the wire 4, for example, it is possible to choose a natural frequency for the device 1 which is sufficiently different from that of the driven member.

Figure 2:
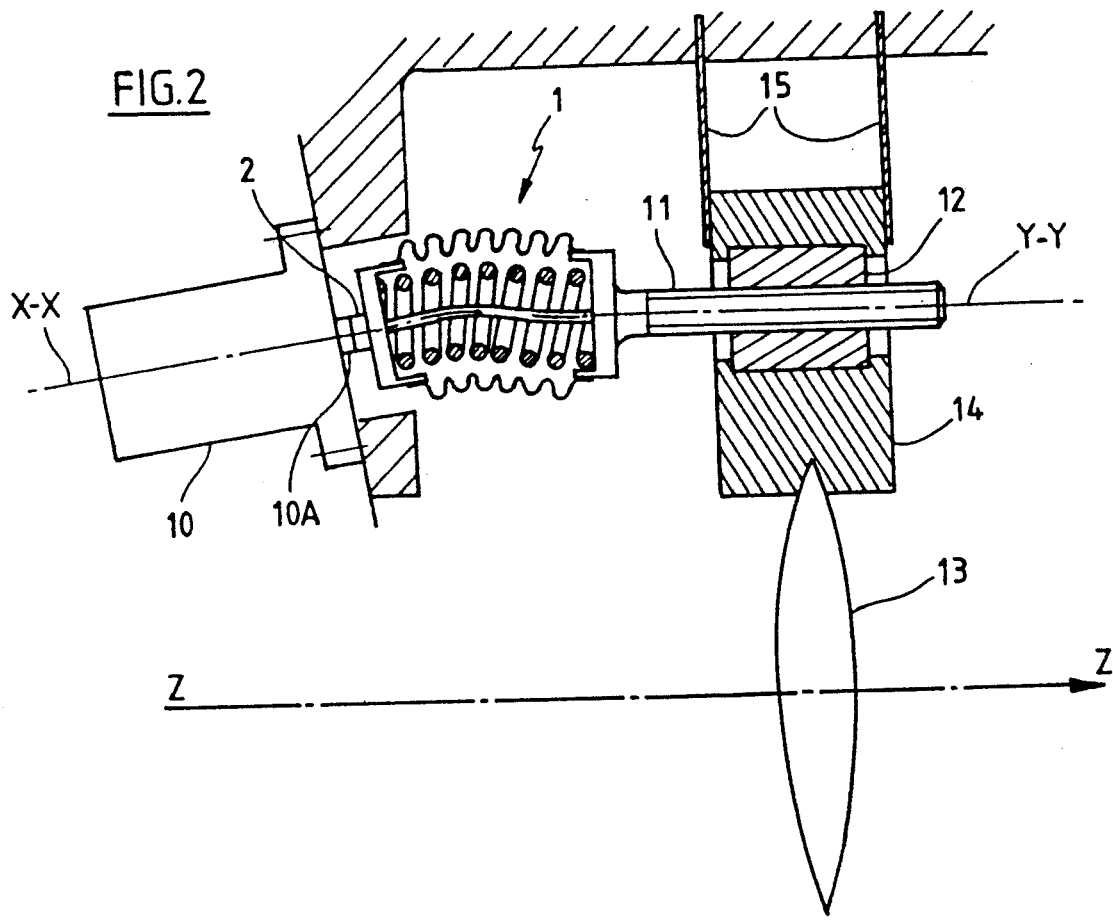
FIG. 2 is a view in longitudinal cross-section of a translation control device incorporating the coupling device from FIG. 1 and applied to positioning a lens along its optical axis.

In the example of FIG. 2, one of the flanges is connected to an output shaft 10A of a rotary stepper motor 10 and the other flange is connected to a lead screw 11 cooperating with a nut 12 whose axis is parallel to the optical axis Z—Z of a lens 13 carried by a frame 14 which in practice is an annular frame (only part of it is shown) to which the nut is attached and which is guided parallel to the Z—Z axis by flexible blade members 15 disposed transversely to the optical axis. In this example, there are two such blade members.

The shaft 10A and the lead screw 11 are substantially coaxial, possibly with an angular offset which is exaggerated in FIG. 2.

The lens mount is advantageously of the type described in French patent application 89-07738.

It will be understood that the transmission joint is flexible in bending but stiff in torsion and circumvents the problem of a non-coaxial relationship between the motor shaft and the axis of the lead screw device on the lens holder.

The aforementioned non-coaxial relationship is absorbed by flexing of the joint as a whole and the motor output torque is transmitted by torsional loading of the metal bellows.

The transmission is free of friction and free of play. The prestressing of the steel wire by the compression spring guarantees a stable position of the lead screw on its axis, so that the displacement is accurate, and allows displacement both ways along the axis.

To give a numerical example, the mobile assembly (lens and lensholder frame 14) has a mass of 5 kg and a travel of 4 mm. The invar wire 4 is 30 mm long and 1 mm in diameter. The spring is prestressed to a force of 40 to 50N and has a diameter of 15 mm. The bellows is made from stainless steel, in practice an a non-magnetic material, and is preferably in the form of a succession of flat rings coupled together in sequence by their inside and outside edges alternately.

It is obvious that the forgoing description has been given by way of non-limiting example only and that numerous variations may be put forward by those skilled in the art without departing from the scope of the invention.

I claim:

1. A rotational coupling device comprising:
   a first flange having a central axis defining a first center, a second flange juxtaposed said first flange, said second flange having a central axis defining a second center;
   a longitudinal flexible member disposed between said first and second flanges, said longitudinal flexible member further being attached to said first and second centers of said first and second flanges, respectively;
   resilient means disposed between said first and second flanges, said resilient means biasing said first and second flanges apart in a direction away from each other, said resilient means placing said longitudinal flexible member in tension; and
   rotary-to-rotary coupling means for translating a rotary movement between said first and second flanges, said rotary-to-rotary coupling means being rigidly attached to said first and second flanges and substantially circumscribing said resilient means and said longitudinal flexible member, said rotary-to-rotary coupling means further being torsionally rigid such that rotary motion imparted to said first flange is transmitted directly to said second flange while substantially eliminating lost rotary motion therebetween.

2. A rotational coupling device according to claim 1 wherein said resilient means is a spring disposed within said rotary-to-rotary coupling means.

3. A rotational coupling device according to claim 1 wherein said longitudinal flexible member is a metal wire.

4. A rotational coupling device according to claim 3 wherein the coefficient of thermal expansion of said metal wire is less than $10^{-6}$/deg.

5. A rotational coupling device according to claim 1 wherein said rotary-to-rotary coupling means is a metal bellows.

6. A device for controlling translation of a mobile unit along a displacement axis, said device comprising:
   a motor;
   a shaft secured to said motor;
   a rotational coupling secured to said shaft such that said rotational coupling is rotatably driven by said motor, said rotational coupling comprising:
   a first flange secured to said shaft, said first flange having a first longitudinal axis defining a first center of said first flange;
   a second flange adjacent to and longitudinally spaced from said first flange, said second flange having a second longitudinal axis defining a second center of said second flange;
   a flexible member disposed between and attached to said first and second centers of said first flange and said second flange, respectively;
   resilient means disposed between said first and second flanges, said resilient means biasing said first and second flanges apart in opposite directions; and a bellows disposed between said first and second flanges so as to be substantially coaxial with said flexible member, said bellows being torsionally rigid;

a lead screw extending from said second center of said second flange in a direction opposite said first flange; and a nut threadably engaged with said lead screw, said mobile unit being mounted to said nut, said nut having a longitudinal axis substantially parallel to said displacement axis.

* * * * *

UNITED STATES PATENT AND TRADEMARK OFFICE
CERTIFICATE OF CORRECTION

PATENT NO. : 5,214,970
DATED : June 1, 1993
INVENTOR(S) : Gerard Vezain

It is certified that error appears in the above-indentified patent and that said Letters Patent is hereby corrected as shown below:

Column 3, line 25, delete "dension" insert ----tension----.

Column 3, line 68, delete "an".

Column 4, line 4, delete "forgoing" and insert ----foregoing----.

Signed and Sealed this

Eighth Day of March, 1994

Attest:

BRUCE LEHMAN

Attesting Officer   Commissioner of Patents and Trademarks